United States Patent
Segev et al.

(10) Patent No.: US 12,041,152 B2
(45) Date of Patent: Jul. 16, 2024

(54) ENHANCED FINE TIMING MEASUREMENT PROTOCOL NEGOTIATION

(71) Applicant: Intel Corporation, Santa Clara, CA (US)

(72) Inventors: Jonathan Segev, Tel Mond (IL); Benny Abramovsky, Petah Tivka (IL); Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 583 days.

(21) Appl. No.: 17/157,641

(22) Filed: Jan. 25, 2021

(65) Prior Publication Data

US 2021/0234947 A1 Jul. 29, 2021

Related U.S. Application Data

(63) Continuation of application No. 16/311,146, filed as application No. PCT/US2017/025054 on Mar. 30, 2017, now abandoned.
(Continued)

(51) Int. Cl.
*H04L 69/28* (2022.01)
*G01S 5/02* (2010.01)
(Continued)

(52) U.S. Cl.
CPC .............. *H04L 69/28* (2013.01); *G01S 5/021* (2013.01); *G01S 13/765* (2013.01);
(Continued)

(58) Field of Classification Search
CPC ....... H04B 7/0413; H04L 47/31; H04L 69/24; H04L 69/28; H04W 64/00; H04W 84/12; G01S 5/0205; G01S 5/021; G01S 13/765
See application file for complete search history.

(56) References Cited

U.S. PATENT DOCUMENTS 9,788,313 B2 10/2017 Ahmadi
9,853,794 B2 12/2017 Wentink et al.
(Continued)

FOREIGN PATENT DOCUMENTS

CN 103190085 A 7/2013
CN 104937872 A 9/2015
(Continued)

OTHER PUBLICATIONS

Assaf Kasher (Intel) et al.: MIMO for NGP; 11-15-1411-00-00az-mimo-for-ngp11, IEEE Draft;11-15-1411-00-00AZ-MIMO-FOR-NGP, IEEE-SA Mentor, Piscataway, NJ USA, vol. 802.11az, (Nov. 10, 2015), pp. 1-10, XP068099400, Slides 2-10.
(Continued)

*Primary Examiner* — David B Lugo
(74) *Attorney, Agent, or Firm* — Eversheds Sutherland (US) LLP

(57) ABSTRACT

This disclosure describes systems, methods, and devices related to enhanced fine timing measurement protocol negotiation. A device may identify an enhanced fine timing measurement request received from a first device, the enhanced fine timing measurement request comprising one or more information elements associated with one or more multiple-input multiple-output (MIMO) parameters. The device may cause to send an enhanced fine timing measurement response to the first device. The device may identify a null data packet announcement associated with a location determination of the first device. The device may identify a null data packet received from the first device. The device may cause to send a null data packet feedback to the first device.

20 Claims, 9 Drawing Sheets

Related U.S. Application Data

(60) Provisional application No. 62/355,643, filed on Jun. 28, 2016.

(51) Int. Cl.
*G01S 13/76* (2006.01)
*H04B 7/0413* (2017.01)
*H04L 47/31* (2022.01)
*H04L 69/24* (2022.01)

(52) U.S. Cl.
CPC ........... *H04B 7/0413* (2013.01); *H04L 47/31* (2013.01); *H04L 69/24* (2013.01); *G01S 5/0205* (2013.01)

(56) References Cited

U.S. PATENT DOCUMENTS

| | | | |
|---|---|---|---|
| 9,867,001 B2 | 1/2018 | Hayes et al. | |
| 2012/0250796 A1* | 10/2012 | Sampath | H04L 5/0007 375/316 |
| 2014/0171109 A1 | 6/2014 | Segev | |
| 2014/0348097 A1 | 11/2014 | Park et al. | |
| 2014/0355461 A1 | 12/2014 | Aldana et al. | |
| 2015/0029986 A1* | 1/2015 | Seok | H04L 25/0224 370/329 |
| 2015/0049716 A1 | 2/2015 | Gutierrez et al. | |
| 2015/0094103 A1* | 4/2015 | Wang | H04W 52/0254 455/456.6 |
| 2016/0088665 A1 | 3/2016 | Kim et al. | |
| 2016/0309472 A1* | 10/2016 | Yong | H04W 76/14 |
| 2017/0134900 A1* | 5/2017 | Malik | H04L 1/0086 |
| 2018/0212738 A1* | 7/2018 | Chun | H04L 1/1685 |
| 2018/0249437 A1* | 8/2018 | Lindskog | G01S 13/878 |

FOREIGN PATENT DOCUMENTS

| | | |
|---|---|---|
| CN | 105101405 A | 11/2015 |
| EP | 2947900 A2 | 11/2015 |
| WO | 2015130618 A2 | 9/2015 |
| WO | 2015147876 A1 | 10/2015 |

OTHER PUBLICATIONS

European Search Report for EP2183036 dated Sep. 15, 2021, 22 pages.

Office Action and Search Report for Chinese Application No. 201780034530.X, mailed Mar. 29, 2021, 22 pages (with english translation).

Chinese Journal Radio Science, "Efficient joint estimation of fine timing and channel impulse response for wideband wireless channels," vol. 29, No. 5, Oct. 2014, 1 page of english abstract.

* cited by examiner

ENHANCED FINE TIMING MEASUREMENT PROTOCOL NEGOTIATION

CROSS-REFERENCE TO RELATED APPLICATIONS

This application is a continuation of U.S. National Stage application Ser. No. 16/311,146, filed Dec. 18, 2018, which claims the priority benefit of PCT International Application No. PCT/US2017/025054, filed Mar. 20, 2017, which claims the benefit of U.S. Provisional Application No. 62/355,643, filed Jun. 28, 2016, the disclosures of which are incorporated herein by reference as if set forth in full.

TECHNICAL FIELD

This disclosure generally relates to systems and methods for wireless communications and, more particularly, to protocol negotiation.

BACKGROUND

Communication devices in wireless systems are becoming widely prevalent and are increasingly requesting services from other communication devices. One of these services is the ability to determine a range or a distance between two communication devices by measuring the time that it takes for the wireless signal to travel from one device to the other.

DETAILED DESCRIPTION

Figure 1:
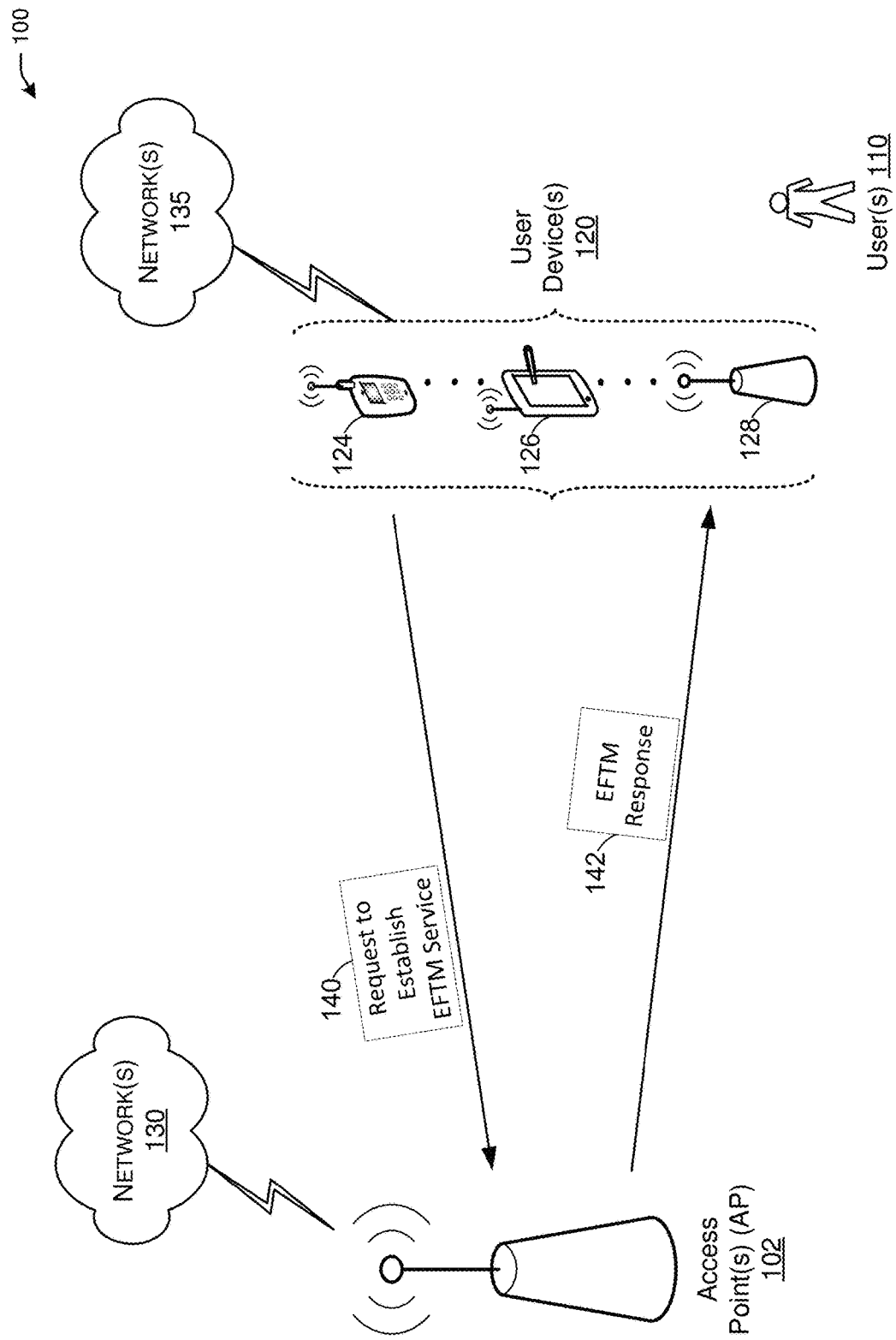
FIG. 1 depicts a network diagram illustrating an example network environment for an enhanced fine timing measurement (EFTM) protocol negotiation, according to some example embodiments of the present disclosure.

Example embodiments described herein provide certain systems, methods, and devices for enhanced fine timing measurement (EFTM) protocol negotiation, including, but not limited to, the IEEE 802.11 family of standards.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A Wi-Fi device may perform a timing measurement procedure, known as fine timing measurement (FTM), in order to allow the Wi-Fi device to determine its range to another device, such as an access point or an FTM responder. The FTM procedure is an IEEE 802.11 protocol introduced to support location determination based on the range measurement to multiple known responding devices and the execution of location determination techniques, for example, triangulation, trilateration, etc.

An FTM procedure may have three phases: a capabilities exchange phase, a measurements phase, and a termination phase. The FTM procedure utilizes management frames as opposed to control frames and Null Data Packet (NDP) frames in order to perform the measurements between an initiator device and a responder device. The FTM operates in both the associated and unassociated modes. REVmc protocol is defined for both very high throughput (VHT) (e.g., IEEE 802.11ac) and high throughput (HT) (e.g., IEEE 802.11n) station devices (STAs) but is essentially a single-input single-output (SISO) protocol using pre-VHT compatible format acknowledgment (ACK) (e.g., Non-HT duplicate ACK) and one transmit chain for each measurement.

A variant of the VHT sounding protocol may be modified in order to include an enhanced FTM request. However, with the introduction of high efficiency multi-user (HE-MU) as one of the predominant modes, the resulting scheduling mechanism in which free access to the channel gets lower probability, gets even lower the more the medium becomes congested.

Example embodiments of the present disclosure relate to systems, methods, and devices for FTM trigger frame signaling.

In one embodiment, an enhanced FTM (EFTM) protocol may include a capabilities exchange phase, a measurements phase, and a termination phase.

In one embodiment, an EFTM protocol negotiation system may be utilized to perform timing measurements between the initiating device and the responder device using control frames as opposed to management frames. Management frames have advantages in terms of negotiation because management frames do not require an immediate response in SIFS (Short Inter-frame Space) time (normally 16 usec) when received. However, management frames require additional processing time. Typically, FTM requires a downlink and uplink paths between the initiator device and the responder device, since the Initiating device in many cases is a client and may not be available "on channel" continuously due to power considerations and other radio activities (e.g., association to an AP on another channel), the FTM protocol provides a means to indicate "on channel availability" at the beginning of the measurement phase, in the REVmc protocol this is done using management frames and followed by management (FTM measurement) and control frame (ACK) for measurement execution. The downside this scheme is that using management frames for "on channel availability" indication is that the processing time of that, is quite long, normally in the 5-10 msec long, and management and control frames provide poor framework for high accuracy medium measurement (AKA channel sounding) to not make use of MIMO as well as other frame formats (ACK frames mandated to use Non-HT Duplicate format which does not contain the VHT-LTF fields at the PPDU level).

Typically, control frames have limited and simpler structures than management frames. Meaning that baseband processing may process control frames using a simpler procedure, resulting in faster processing (e.g., in microseconds). However, control frames are less flexible than management frames and are poor framework for complex signaling such as one used for negotiation and capability exchange phase. Control frames are fixed in size while management frames are capable being extended to add new capabilities. Management frames are not limited or fixed in size. Further, control frames may not include information elements, which may be used to extend the management frames.

In one embodiment, the EFTM protocol negotiation system may include a backward-compatible negotiation that may enable the measurement protocol to operate in both the associated and the unassociated modes, and may provide a single capability exchange and resource allocation negotiation used for multiple measurement exchanges, which minimizes the medium overhead caused by the negotiation.

In one embodiment, an EFTM protocol negotiation system may introduce a capabilities exchange phase that includes the functionality of the negotiation phase of the FTM procedure. The capabilities exchange phase may utilize one or more management frames that may be enhanced to include additional information. The capabilities exchange phase may include one or more information elements (IEs) that may be added to an FTM request frame. A benefit of the management frames as opposed to the control frames is that management frames may be modified to include additional IEs. Additionally, a legacy device that receives the FTM request that includes unrecognized additional IEs may ignore those IEs, which in turn makes the EFTM protocol negotiation system to be backward-compatible with legacy devices. For example, the EFTM protocol negotiation system may be backward-compatible with the existing legacy REVmc protocol, such that an IEEE 802.11az device may be able to communicate with a VHT access point (AP) or legacy device supporting legacy FTM (i.e. STDS IEEE 802.11-2016 FTM) in a legacy compatible way, while using the new operational mode when both AP and device are IEEE 802.11az capable. One of the advantages is that the negotiation with legacy STA is not necessarily needed in the legacy mode. Legacy STAs are mandated to ignore unrecognized (new) IEs so the new STA includes both the legacy and new IEs and legacy STAs process only the legacy IEs while new STAs supporting the new mode process both legacy and new IEs.

In one embodiment, an EFTM protocol negotiation system may utilize one or more control frames and physical layer (PHY) convergence protocol data unit (PPDU) (e.g., NDP) during the measurements phase of the FTM procedure. The EFTM protocol negotiation system may keep the flexibility of the management frames during the capabilities exchange phase while enhancing the entire FTM procedure by decreasing the time it takes to perform the measurements by using control frames, which do not require as much waiting time between frames as management frames. The measurements phase may include an exchange of null data packets (NDPs) between the AP and an STA. An NDP is a physical layer (PHY) protocol data unit (PPDU) that carries no data field.

In one embodiment, the EFTM protocol negotiation system may facilitate an IEEE 802.11az STA to transmit an enhanced FTM request, in post discovery (e.g., using active or a passive scan beacon), that may include a new IE for supporting the enhanced VHT and HE (High Efficiency IEEE 802.11ax) multiple-input multiple-output (MIMO) parameters indicating the capabilities of the STA (e.g., number of supported transmit (TX) chains, number of supported receive (RX) chains, supported bandwidths, etc.) together with its legacy capabilities (e.g., existing REVmc FTM parameters, location configuration information (LCI) request indication, etc.).

The 802.11ac protocol uses a referencing mechanism for the media access control (MAC) address that uses what is known as an associated ID (AID) instead of the MAC address. The MAC addresses are typically hardcoded in the devices during manufacturing. However, the AID or Pre-AID (Pre-association ID) assigned to the device during association. Therefore, one additional consideration for the EFTM protocol negotiation system is to introduce a new addressing mechanism during the pre-association phase because the MAC addressing is not compatible with it and because the FTM procedure has to operate in the associated and the unassociated modes. In the unassociated cases, addressing is not yet established since the AID would not have been assigned yet. Therefore, the EFTM protocol negotiation system may facilitate a new addressing mechanism in order to account for the unassociated cases; however, this new addressing mechanism may also apply to the associated mechanism. The new addressing mechanism is referred to hereinafter as a pre-association ID (pre-AID) or an unassociated ID (UID). The terms pre-AID and UID maybe interchangeable within this disclosure. In the associated mode, a device may use an AID or a UID.

During the capabilities exchange phase, if the device is already associated with the AP, then both the device and the AP know each other's capabilities. During association, the security context is established. In the case of the EFTM procedure, the security context may be desirable. Consequently, the one or more additional IEs may include an IE associated with the security context that may be exchanged between the AP and the STA.

In one embodiment, the EFTM protocol negotiation system may be configured to allow a legacy AP to ignore the newly defined IE and may respond with a legacy FTM response frame, while an IEEE 802.11az capable AP may respond with an FTM response frame including a new IEEE 802.11az IE providing its capabilities (e.g., supported bandwidth, number of supported TX chains, number of supported Rx chains, LCI for all antennas) and may assign a unique identifier for the unassociated operation unique identifier (UID). The UID may be maintained using a keep alive process of transmitting a null data packet announcement (NDPA) for location, and resetting the timer. If no NDPA is received within a certain defined period of time, the UID may expire and the AP may assign the UID to another STA.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 depicts a network diagram illustrating an example network environment for an EFTM protocol negotiation, according to some example embodiments of the present disclosure. Wireless network 100 may include one or more user devices 120 and one or more responding device(s) (e.g., AP 102), which may communicate in accordance with IEEE 802.11 communication standards. The user device(s) 120 may be mobile devices that are non-stationary (e.g., not having fixed locations) or may be stationary devices.

Figure 6:
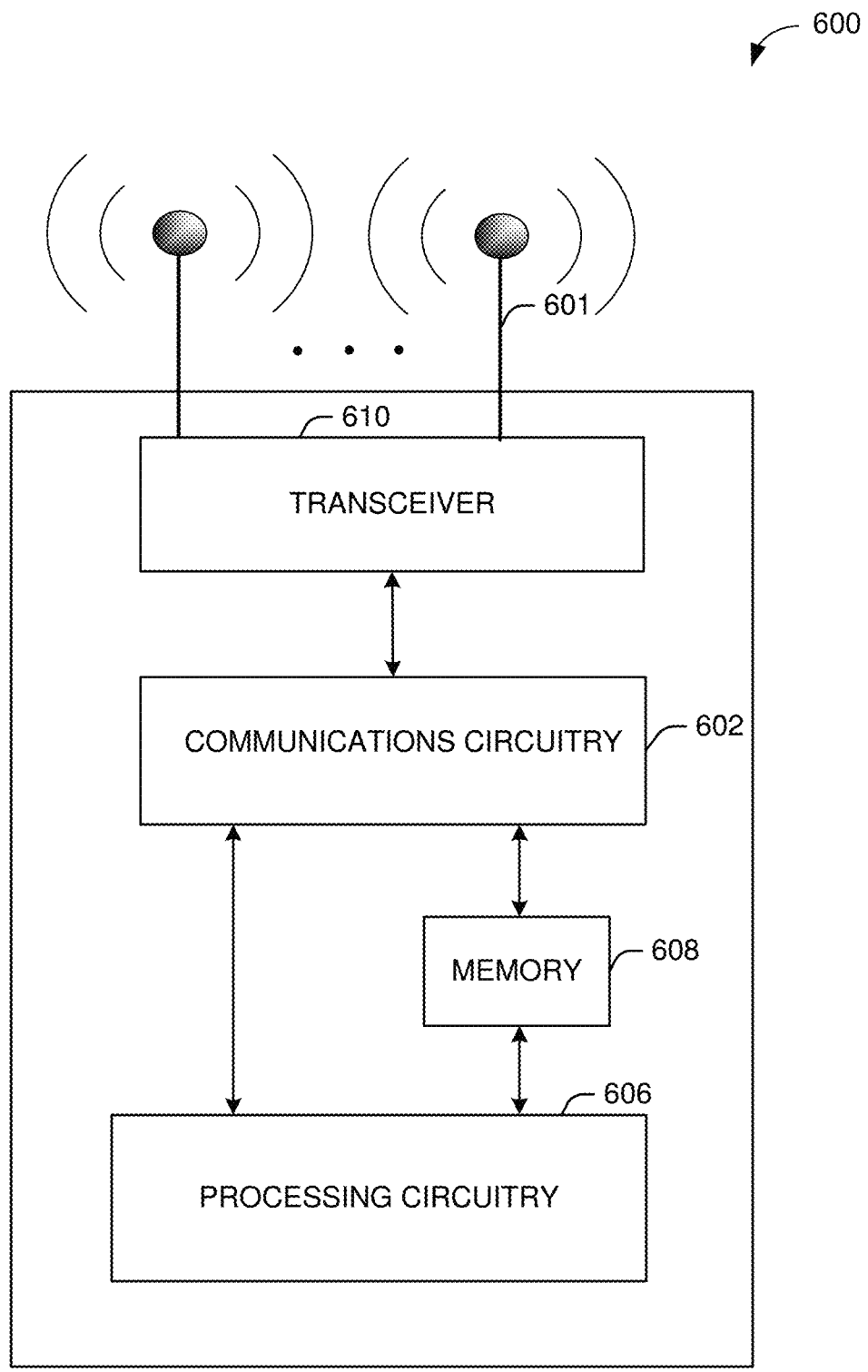
FIG. 6 illustrates a functional diagram of an example communication station that may be suitable for use as a user device, in accordance with one or more example embodiments of the present disclosure.
Figure 7:
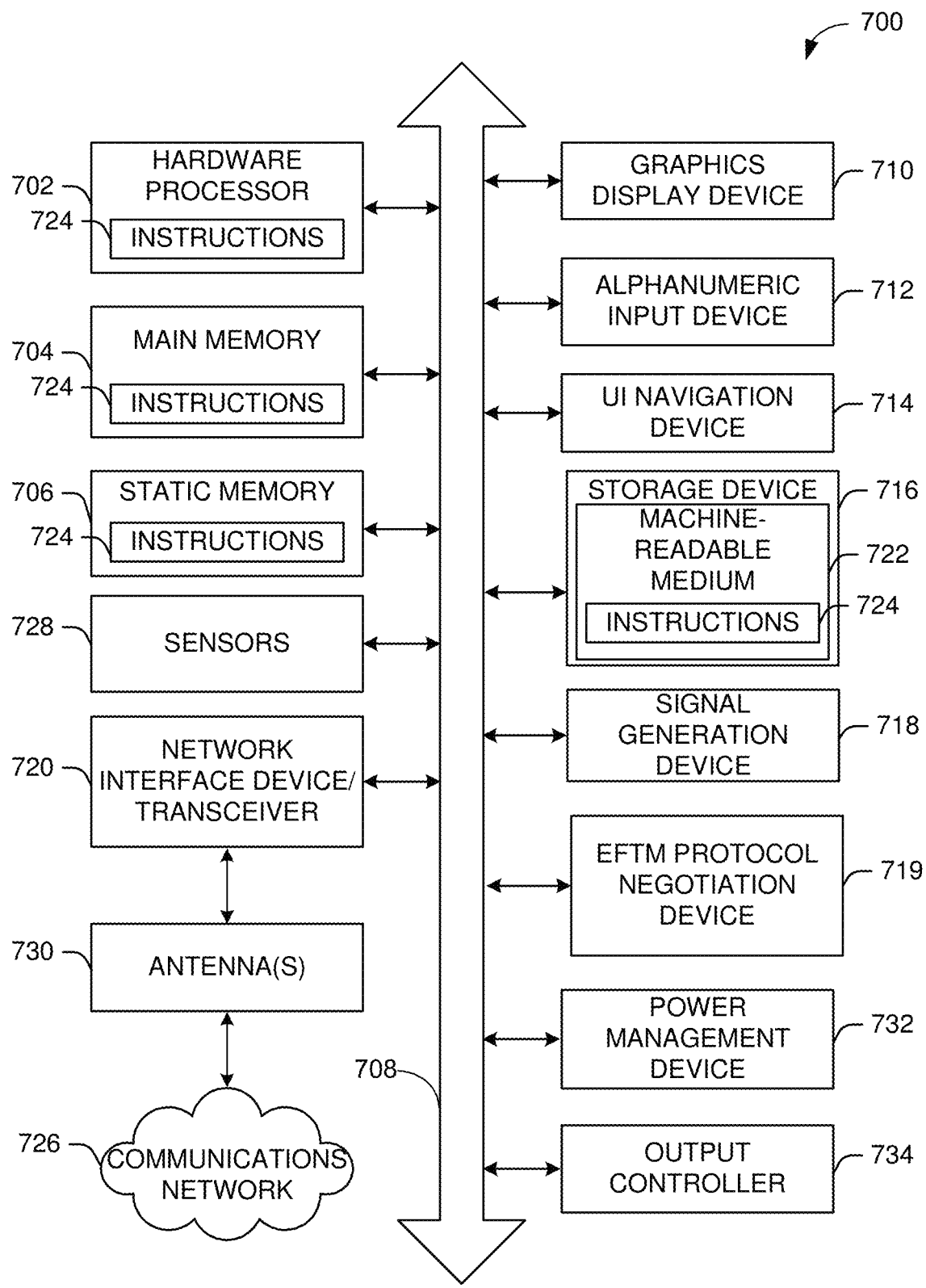
FIG. 7 is a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 6 and/or the example machine/system of FIG. 7.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultra-book™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra-mobile device (UMD), an ultra-mobile PC (UMPC), a mobile internet device (MID), an "origami" device or computing device, a device that supports dynamically compass-able computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., directional multi-gigabit (DMG) antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHz channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

When an AP (e.g., AP 102) establishes communication with one or more user devices 120 (e.g., user devices 124, 126, and/or 128), the AP 102 may communicate in a downlink direction and the user devices 120 may communicate with the AP 102 in an uplink direction by sending frames in either direction. The user devices 120 may also communicate peer-to-peer or directly with each other with or without the AP 102. The frames may be preceded by one or more preambles that may be part of one or more headers. These preambles may be used to allow a device (e.g., AP 102 and/or user devices 120) to detect a new incoming data frame from another device. A preamble may be a signal used in network communications to synchronize transmission timing between two or more devices (e.g., between the APs and user devices).

The IEEE 802.11 standard defines various frame types that devices may use for communications as well as managing and controlling the wireless link. These frame types may include data frames or signaling frames. The signaling frames may be divided into control frames and management frames. Management frames enable devices to establish and maintain communications. Some examples of management frames may include, but are not limited to, fine timing measurement frame, authentication frames, association request frame, association response frame, beacon frame, etc. control frames may assist in the delivery of data frames between devices. Some examples of control frames may include, but not limited to, request to send frame, clear to send frame, acknowledgment frame, null data packet frame (NDP), etc.

Typically, control frames have limited and simpler structures than management frames. Meaning that baseband processing may process control frames using a simpler procedure, resulting in faster processing. However, control frames are less flexible than management frames.

With reference to FIG. 1, the one or more user devices 120 and/or the AP 102 may perform an EFTM procedure. The EFTM procedure may, for example, determine the location of an initiating device (e.g., the user devices 120) based on time differences between various frames sent and received between the initiating device and a responding device (e.g., the AP 102). An EFTM procedure may start with the initiating device (e.g., user device 124) sending a request to establish the EFTM service (e.g., request to establish EFTM service 140) to a responding device (e.g., the AP 102). The responding device may respond by sending an EFTM response 142). It is understood that the above descriptions are for purposes of illustration and are not meant to be limiting.

Figure 2A:
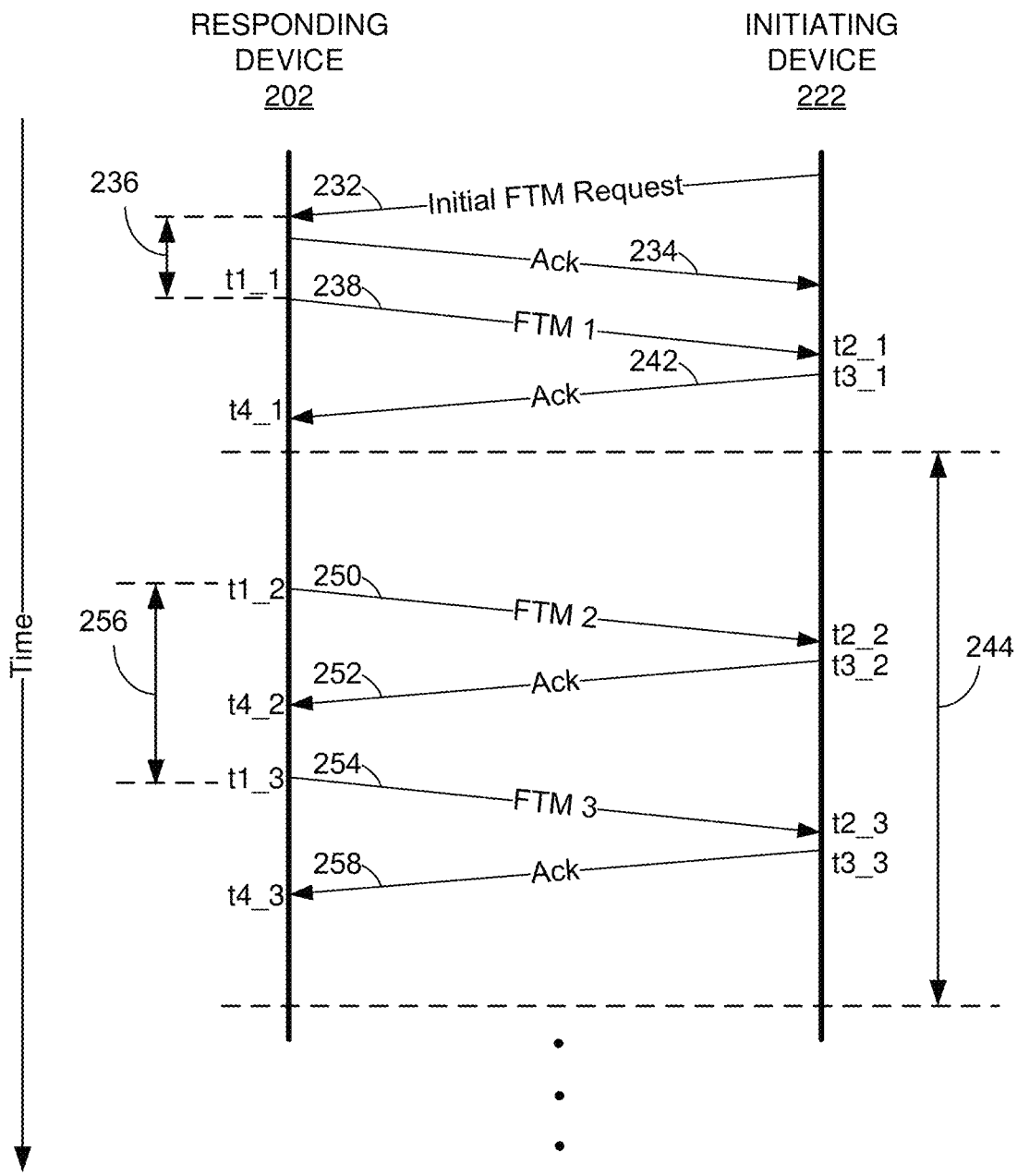
FIG. 2A depicts an illustrative schematic diagram of a fine timing measurement (FTM) procedure between an initiating device and a responding device.

FIG. 2A depicts an illustrative schematic diagram of an FTM procedure between an initiating device and a responding device.

With reference to FIG. 2A, there is shown an initiating device 222 and a responding device 202. The initiating device 222 and the responding device 202 may be involved in an FTM procedure in order for the initiating device 222 to determine, at least in part, its range to the responding device 202. When performing the FTM procedure, the initiating device 222 may start the FTM procedure by sending an initial FTM request 232 to the responding device 202. The responding device 202 may send an acknowledgment (e.g., Ack 234) to the initiating device 222. The responding device 202 may determine a delay 236 before sending a first FTM frame 238 to the initiating device 222. The first FTM frame 238 may include information to inform the initiating device 222 of the burst duration and the burst period that the FTM procedure will be carried out for measuring delays in order to determine the location of the initiating device 222. When the initiating device 222 receives the first FTM frame 238, the initiating device 222 may process the first FTM frame 238. Each time the initiating device 222 receives a frame from the responding device 202 and vice versa, a certain delay may increase the overall duration of the FTM measurements due to processing time for the received frames. The initiating device 222 may send an acknowledgment (e.g., Ack 242) in response to the received first FTM frame 238. The initiating device 222 and the responding device 202 may perform the FTM messaging in order to take time measurements within a burst duration 244. The responding device 202, at time t1_2 may send the second FTM frame 250 and start the time measurement. At time t2_2, the initiating device 222 may receive the second FTM frame 250. After a processing delay, at time t3_2, the initiating device 222 may send an Ack 252 to the responding device 202. The Ack 252 may be received by the responding device 202 at time t4_2. The responding device 202 may send a third FTM frame 254 at time t1_3 to the initiating device 222. The third FTM frame 254 may be received by the initiating device 222 at time t2_3, and the initiating device 222 may respond by sending Ack 258 at time t3_3. The Ack 258 may be received by the responding device 202 at time t4_3.

Figure 2B:
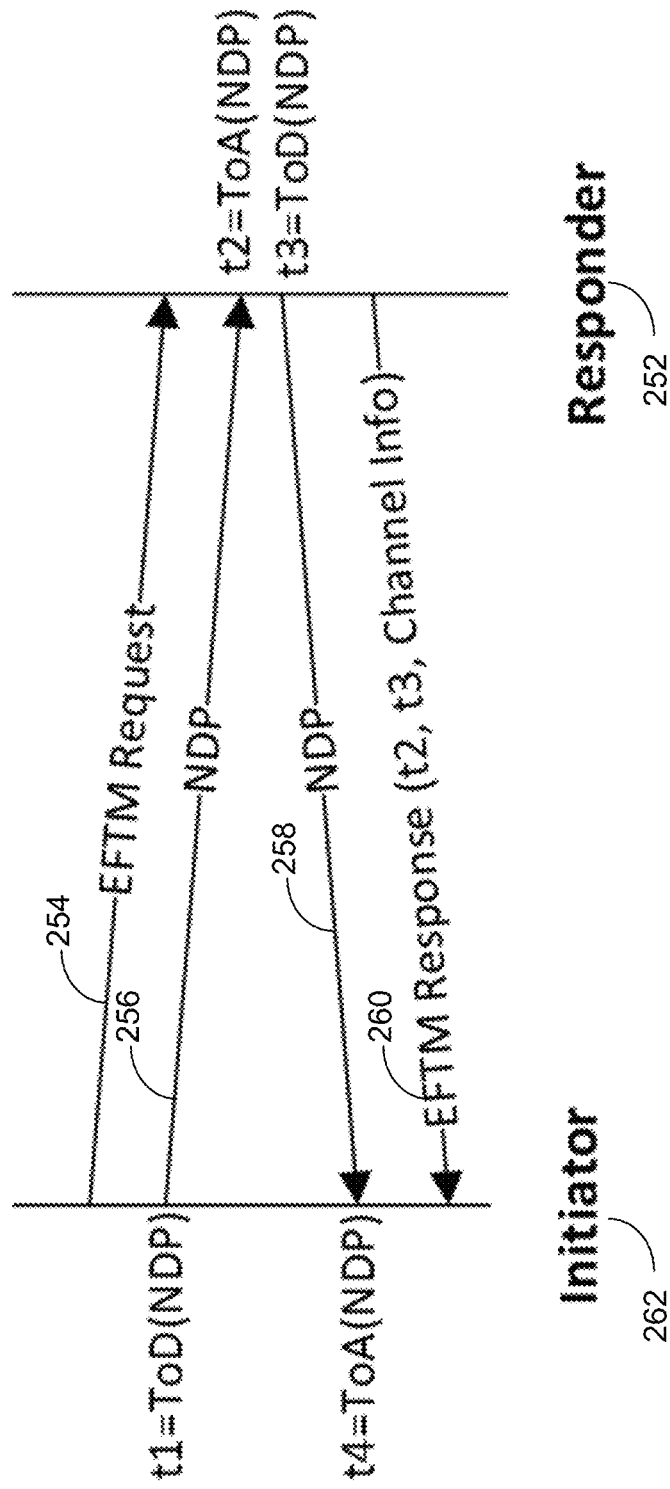
FIG. 2B depicts an illustrative flow diagram of a variant of the very high throughput (VHT) sounding protocol, in accordance with one or more example embodiments of the present disclosure.

FIG. 2B depicts an illustrative flow diagram of a variant of the VHT sounding protocol, in accordance with one or more example embodiments of the present disclosure.

In one embodiment, an EFTM protocol negotiation system may facilitate the use of a variant of a VHT sounding protocol that uses one or more null data packets (NDPs) in order to perform a VHT sounding procedure. A VHT sounding protocol is an explicit beamforming mechanism where a beamformer sends an NDP to the beamformee and the beamformee receives the NDP and creates a steering feedback that is sent to the beamformer.

A VHT sounding protocol uses control frames instead of management frames in order to achieve the sounding measurements. However, the VHT sounding mechanism may include one or more shortcomings that may need to be addressed. For example, with the introduction of high efficiency multi-user (HE-MU) as one of the predominant modes, the resulting scheduling mechanism in which free access to the channel gets lower probability, gets even lower the more the medium becomes congested.

Further, the VHT protocol operates in the associated mode, meaning that a device is already associated with an AP, while the EFTM protocol is required to operate in the unassociated mode as well as the associated mode. This may mean that no AID (Association ID) has been assigned to the STA yet (e.g., initiator 262), and no AP (e.g., responder 252) or STA capability exchange (e.g., bandwidth, modulation, number of transmit (TX) and receive (RX) chains, etc.) has been negotiated between the initiator 262 and the responder 252.

In one embodiment, an EFTM protocol negotiation system may enhance the VHT sounding protocol by using an EFTM request 254 followed by NDP frame 256 from the initiator 262 to the responder 252. The responder 252 may respond with NDP frame 258 followed by an EFTM response 260. However, an EFTM protocol negotiation system may take into account other considerations for an FTM procedure to be used to determine the range of the initiator 262 to the responder 252.

In one embodiment, an EFTM protocol negotiation system may enhance the VHT sounding protocol by introducing a new addressing mechanism in order to overcome the problems with the VHT sounding protocol. For example, one additional consideration for the EFTM protocol negotiation system is to introduce a new addressing mechanism because the MAC addressing is not compatible with it and because the FTM procedure has to operate in the associated and the unassociated modes. In the unassociated cases, addressing is not yet established since the AID would not have been assigned yet. Therefore, the EFTM protocol negotiation system may facilitate a new addressing mechanism in order to account for the unassociated cases; however, this new addressing mechanism may also apply to the associated mechanism. The new addressing mechanism is referred to hereinafter as an unassociated ID (UID). In the associated mode, a device may use an AID or a UID.

In one embodiment, the EFTM protocol negotiation system may be configured to be backward-compatible with legacy devices. The EFTM protocol negotiation system may allow a legacy AP to ignore the newly defined IE and may respond with a legacy FTM response frame, while an IEEE 802.11az capable AP may respond with an FTM response frame including a new IEEE 802.11az IE providing its capabilities (e.g., bandwidth, number of supported TX chains, number of supported RX chains, LCI for all antennas) and may assign a unique identifier for the unassociated operation unique identifier (UID).

In one embodiment, an EFTM protocol negotiation system may facilitate the use of a variant of the VHT sounding protocol to perform one or more repeated measurements to perform an FTM procedure to determine the range of the initiator 262 to the responder 252. In one example, an EFTM protocol negotiation system may employ the use of control frames, such as NDP frames, for the repeated measurements to perform an FTM procedure. It is understood that the above descriptions are for purposes of illustration and are not meant to be limiting.

Figure 3:
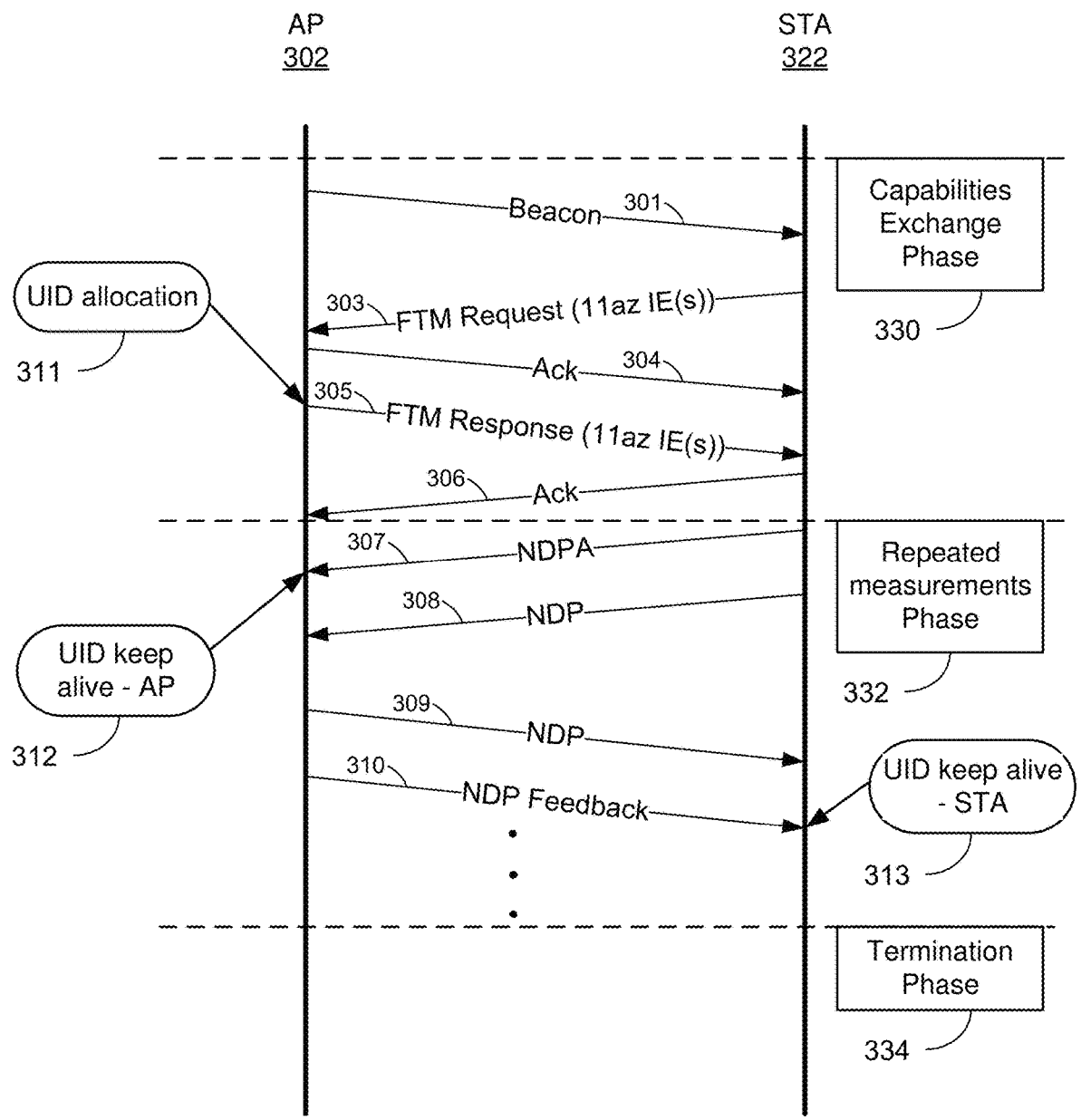
FIG. 3 depicts an illustrative flow diagram for EFTM protocol negotiation, in accordance with one or more example embodiments of the present disclosure.

FIG. 3 depicts an illustrative flow diagram for EFTM protocol negotiation, in accordance with one or more example embodiments of the present disclosure.

With reference to FIG. 3, there is shown an EFTM message flow between a responding device (e.g., AP 302) and an initiating device (e.g., STA 322). The EFTM protocol negotiation system may include a capabilities exchange phase 330, a repeated measurements phase 332, and a termination phase 334. An EFTM message flow may include a combination of REVmc FTM flow and a modified version of sounding VHT measurement used for location determination. In one example, the EFTM message flow may be performed with an STA (e.g., STA 322) that may be either associated or unassociated with the AP (e.g., AP 302). However, NDP measurement frames in 802.11ac are typically performed only in the associated mode using a short identity called AID allocated by the AP. The EFTM protocol negotiation system may provide a different identity for unassociated STAs.

During the capabilities exchange phase 330, the AP 302 may send a beacon frame 301 to STA 322. The STA 322 may send an EFTM request 303 in order to request an FTM service from the AP 302. The AP 302 may respond with an acknowledgment (e.g., Ack 304) indicating that it has received the EFTM request 303. Further, the AP 302 may send an EFTM response 305 to the STA 322. In turn, the STA 322 may respond with an acknowledgment (e.g., Ack 306), acknowledging the reception of the EFTM response 305. The EFTM request 303 and the EFTM response 305 may include one or more new IEs for supporting the enhanced VHT MIMO parameters. During the capabilities exchange phase 330, an EFTM protocol negotiation system may include a negotiation phase for the EFTM protocol to enable the AP 302 and the STA 322 to discover and perform capability exchange while being backward-compatible with the existing legacy REVmc protocol such that an IEEE 802.11az STA can communicate with a VHT AP legacy STA supporting legacy FTM in a legacy compatible way, while using the new operational mode when both the AP and the STA are IEEE 802.11az capable. For example, the EFTM protocol negotiation system may facilitate the STA 322, which may be an IEEE 802.11az STA, to transmit the EFTM request 303, in post discovery (e.g., using a passive scan beacon). The EFTM request 303 may include at least one new IE for supporting the enhanced VHT MIMO parameters (e.g., number of supported TX chains, number of supported RX chains, supported BWs, etc.) together with its legacy capabilities (e.g., existing REVmc FTM parameters, location context identifier (LCI) request indication, etc.).

In one embodiment, the EFTM protocol negotiation system may be configured to allow a legacy AP to ignore the newly defined IE (normal 802.11 operation) and may respond with a legacy FTM response frame, while an IEEE 802.11az capable AP may respond with a FTM response frame including a new IEEE 802.11az IE providing its capabilities (e.g., BW, number of supported TX chains, number of supported RX chains, LCI for all antennas) and may assign a unique identifier for the unassociated operation unique identifier (UID). The UID allocation 311 by the AP 302 may occur when the AP 302 responds to the EFTM request 303. For example, the AP 302 may allocate a UID to STA 322 around the time the AP 302 sends the EFTM response 305.

During the capabilities exchange phase 330, if the STA 322 is already associated with the AP 302, then both the STA 322 and the AP 302 know each other's capabilities. During association, the security context is established. In the case of the EFTM procedure, the security context may be desirable. Consequently, the one or more additional IEs may include an IE associated with the security context that may be exchanged between the AP and the STA.

The UID may be maintained during the repeated measurements phase 332 using a keep alive process 312 on the AP 302. For example, the STA 322 may send a null data packet announcement (NDPA) 307 for location to the AP 302 to reset the timer. If no NDPA 307 is received within a certain defined period, the UID may expire and the AP 302 may assign the UID to another STA 322. During the capabilities exchange phase 330, the STA 322 may query the AP 302 about relevant information for REVmc and IEEE 802.11az measurements, and the STA 322 may ask for allocation of bandwidth and other relevant parameters and receive the UID for the repeated measurement part instead of the AID. During this phase, the STA 322 may specify what the periodicity of the measurement procedure is. This may help the AP 302 and the STA 322 to later determine if the UID was expired. Examples of relevant unique information for IEEE 802.11az may be the location and geometry of the AP 302 and the STA 322 antenna array.

During the repeated measurements phase 332, the AP 302 and the STA 322 may be involved in multiple measurements in order to determine the range of the STA 322 to the AP 302. For illustration purposes, only one measurement sequence is shown that includes one or more messages (e.g., NDPA 307, NDP 308, NDP 309, and NDP feedback 310). This measurement sequence may be repeated as necessary in order to achieve the required FTM measurements.

In the NDP feedback 310, the AP 302 may send the following information: a feedback matrix, the NDP time of arrival (TOA or t1) and the last NDP time of departure (TOD or t4). The UID may be maintained on the initiator device side (e.g., the STA 322) using a keep alive process 313 that may reset a timer associated with releasing the UID for the STA 322 when an NDP feedback 310 is received by the STA 322. If the NDP feedback 310 is not received within a certain defined period, the UID may expire and the AP 302 may assign it to another STA 322. However, if the NDP feedback 310 is received by the STA 322 before the expiry of the timer, the timer may be reset through the UID keep alive process 313.

The termination phase 334 may be completed by simply letting the UID expire by not performing measurements with the AP for a certain period of time.

The flow of FIG. 3 may be backward-compatible and may support legacy devices and REVmc devices in the following way: (1) the AP 302 may use one bit to signal that the AP 302 is location capable; (2) the first handshake between the STA 322 and the AP 302 may determine if the flow will be for an IEEE 802.11 REVmc FTM or a new flow. The flow of FIG. 3 may be such that upon receiving an EFTM request 303 for FTM measurement that includes an IEEE 802.11az IE and IEEE 802.11 REVmc IE, the AP 302 may ignore them if it supports only REVmc, and the AP 302 may reply to them and trigger the new flow if it supports IEEE 802.11az. Further, upon receiving FTM measurement with IEEE 802.11 REVmc IE, the AP 302 may act as specified in the IEEE 802.11 REVmc, even if it supports revision IEEE 802.11az (e.g., performing a regular FTM procedure as opposed to an EFTM procedure). It is understood that the above descriptions are for purposes of illustration and are not meant to be limiting.

Figure 4:
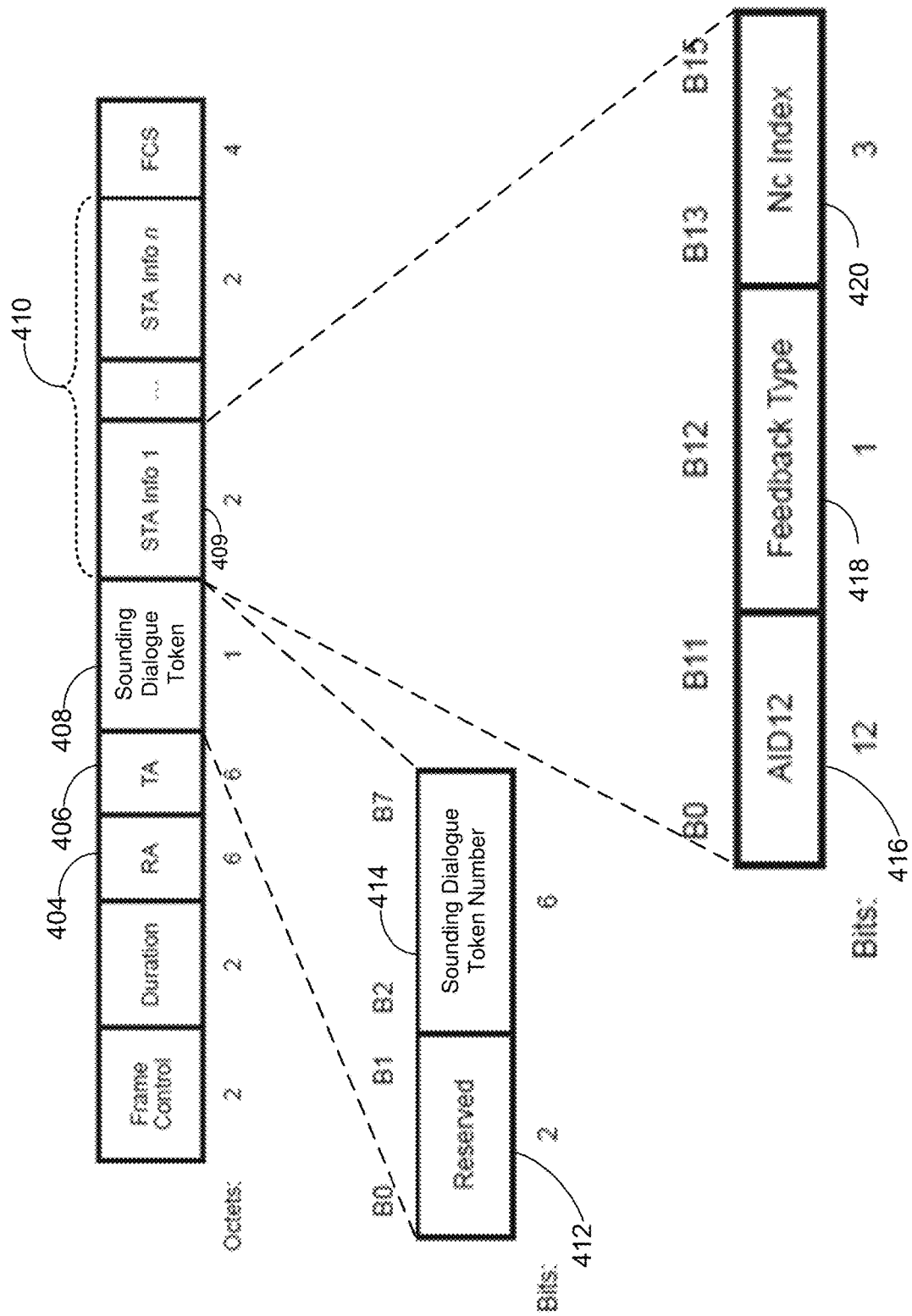
FIG. 4 depicts an illustrative announcement frame, in accordance with one or more example embodiments of the present disclosure.

FIG. 4 depicts an illustrative announcement frame, in accordance with one or more example embodiments of the present disclosure.

Referring to FIG. 4, there is shown a frame that may be used for the repeated measurements phase 332 of FIG. 3.

In the repeated measurements phase 332 of FIG. 3, the measurement may be done by using a variant VHT sounding measurement. In the start of this phase, the STA may send an NDPA message to the AP. The NDPA message may include one or more fields that may assist the AP in determining information associated with the STA. For example, the NDPA message may include a receiver address (RA) 404, a transmitter address (TA) 406, a sounding dialogue token 408, followed by a series of fields that may include information associated with the STA (e.g., fields 410). The STA may signal that this NDPA is an NDPA for location determination by setting one or more of the fields of the NDPA. For example, the sounding dialogue token 408 may be used to set one or more bits to indicate that this NDPA is for FTM location determination.

The sounding dialogue token 408 may include a reserved field 412 and a sounding dialogue token number 414. In one embodiment, an EFTM protocol negotiation system may utilize one of the free bits of the reserved field 412. By using the free bit, the STA may signal to the AP that a location specific NDP measurement is going to be done next. Using this bit will also signal to the AP to treat the AID field in an STA information field (e.g., field 409) as a UID. This way, an AP may allocate 12 bits to AID and 12 bits to UID separately.

The STA information field may include at least in part, an AID field 416, a feedback type field 418, and a number of columns (NC) index 420.

Measurements may be performed periodically. The measurements may also serve as keep alive from the AP and the STA sides keeping the UID valid. If the AP does not receive the NDPA for a predetermined number of periods of time from the STA, or the STA did not receive NDP feedback from the AP for a predetermined number of periods of time as was defined in the capabilities exchange phase 330 of FIG. 3, the UID may expire and a new UID may be allocated using the repeated capabilities exchange 330.

Figure 5A:
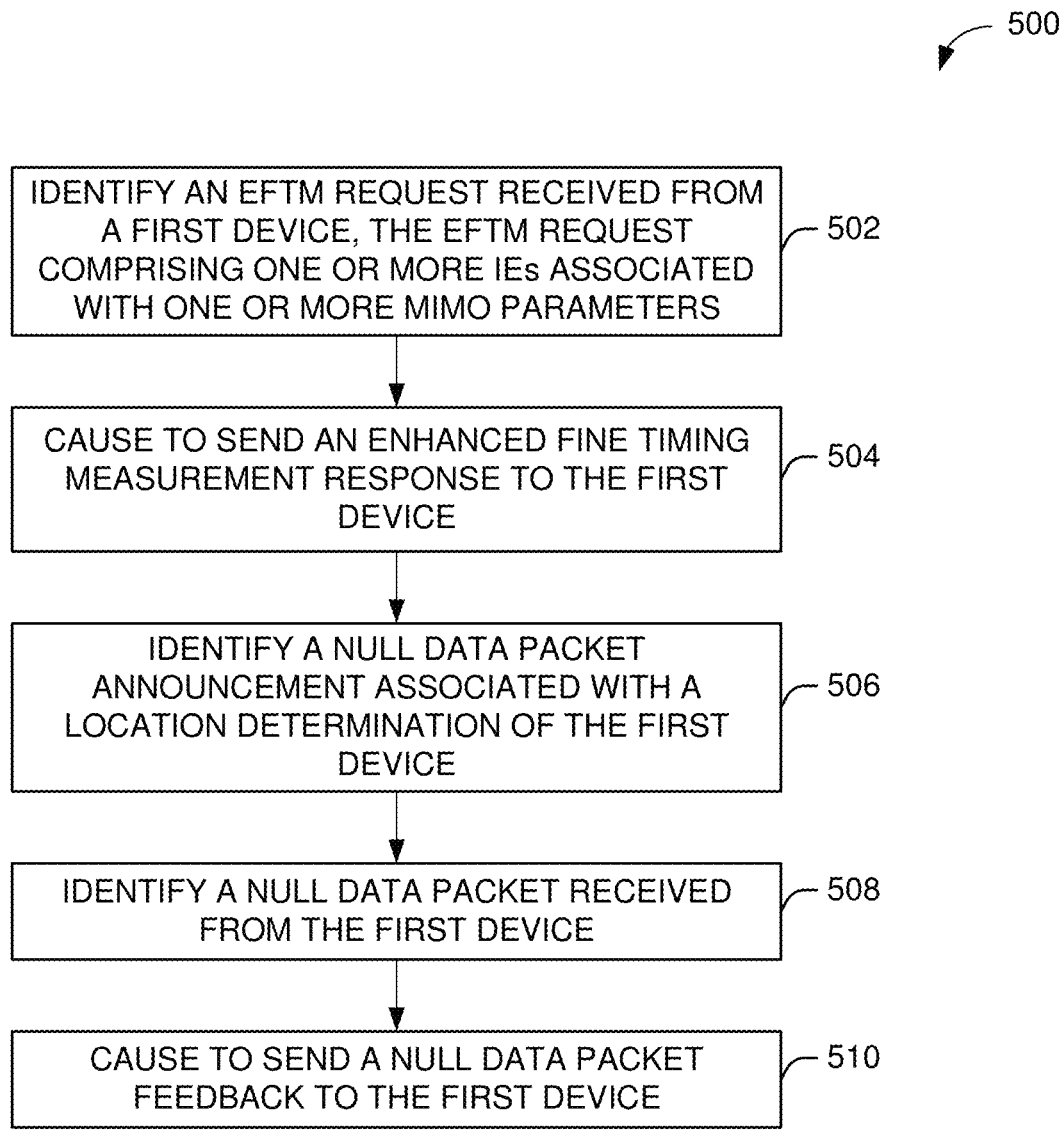
FIG. 5A depicts a flow diagram of an illustrative process for EFTM protocol negotiation, in accordance with one or more example embodiments of the present disclosure.

FIG. 5A illustrates a flow diagram of a process 500 for EFTM protocol negotiation, in accordance with one or more example embodiments of the present disclosure.

At block 502, a device (e.g., the user device(s) 120 and/or the AP 102 of FIG. 1) may identify an enhanced fine timing measurement (EFTM) request received from a first device (e.g., the user device(s) 120 and/or the AP 102 of FIG. 1), the EFTM request comprising one or more information elements (IEs) associated with one or more multiple-input multiple-output (MIMO) parameters, such that this request is enhanced by having additional IEs specific to the IEEE 802.11az specification. The EFTM request may be a variant of a VHT sounding protocol. For example, a user device 120 may wish to determine its range with respect to an AP 102. In order to determine the range, the user device may initiate an EFTM protocol negotiation with the AP 102 by sending an EFTM request to the AP 102. The one or more IEs may be used for supporting the enhanced VHT MIMO parameters (e.g., number of supported TX chains, number of supported RX chains, supported BWs, etc.) together with its legacy capabilities (e.g. existing REVmc FTM parameters, location configuration information (LCI) request indication, etc.). The one or more IEs included in the EFTM request may be ignored by legacy devices such that the FTM procedure can still be completed making the EFTM protocol negotiation backward-compatible. For example, if the AP 102 and/or the user device 120 are legacy devices, the one or more IEs may be ignored such that the fine timing measurement seizure can still be completed.

At block 504, the device may cause to send an EFTM response to the first device. For example, the AP 102 may first respond with an acknowledgment indicating that it has received the EFTM request. The AP 102 may send an EFTM response to the user device 120. In turn, the user device 120 may respond with an acknowledgment, acknowledging the reception of the EFTM response. Similar to the EFTM request, the EFTM response may include one or more new IEs for supporting the enhanced VHT MIMO parameters. These messages may comprise the capabilities exchange phase of an FTM procedure. During this stage, the AP 102 and the user device 120 are able to determine how to perform the FTM procedure using their capabilities. Further, the AP 102 and the user device 120 may utilize a new addressing mechanism in order to account for the unassociated cases which are not typically included in a sounding procedure. The AP 102 may allocate a UID to the user device 120, which can be used not only in the unassociated mode, but also in the associated mode. However, the AP 102 may also use either an AID or a UID during the communication with the user device 120.

At block 506, the device may identify a null data packet announcement associated with a location determination of the first device. For example, after completing the capabilities exchange phase of the FTM procedure, the user device 120 and the AP 102 may enter the measurements phase such that one or more control frames are used, instead of management frames, in order to enhance the FTM procedure. During this measurements phase, the AP 102 and the user device 120 may be involved in multiple measurements in order to determine the range of the user device 120. To start the measurements phase, the user device 120 may signal that this NDPA is an NDPA for location determination by setting one or more of the fields of the NDPA. For example, a sounding dialogue token field within the NDPA may be used to set one or more bits to indicate that this NDPA is for FTM location determination.

At block 508, the device may identify a null data packet received from the first device. For example, the user device 120 may send an NDP to the AP 102.

At block 510, the device may cause to send a null data packet feedback to the first device. In the NDP feedback, the AP may send the following information: a feedback matrix, the NDP time of arrival, and the last NDP time of departure. It is understood that the above descriptions are for purposes of illustration and are not meant to be limiting.

Figure 5B:
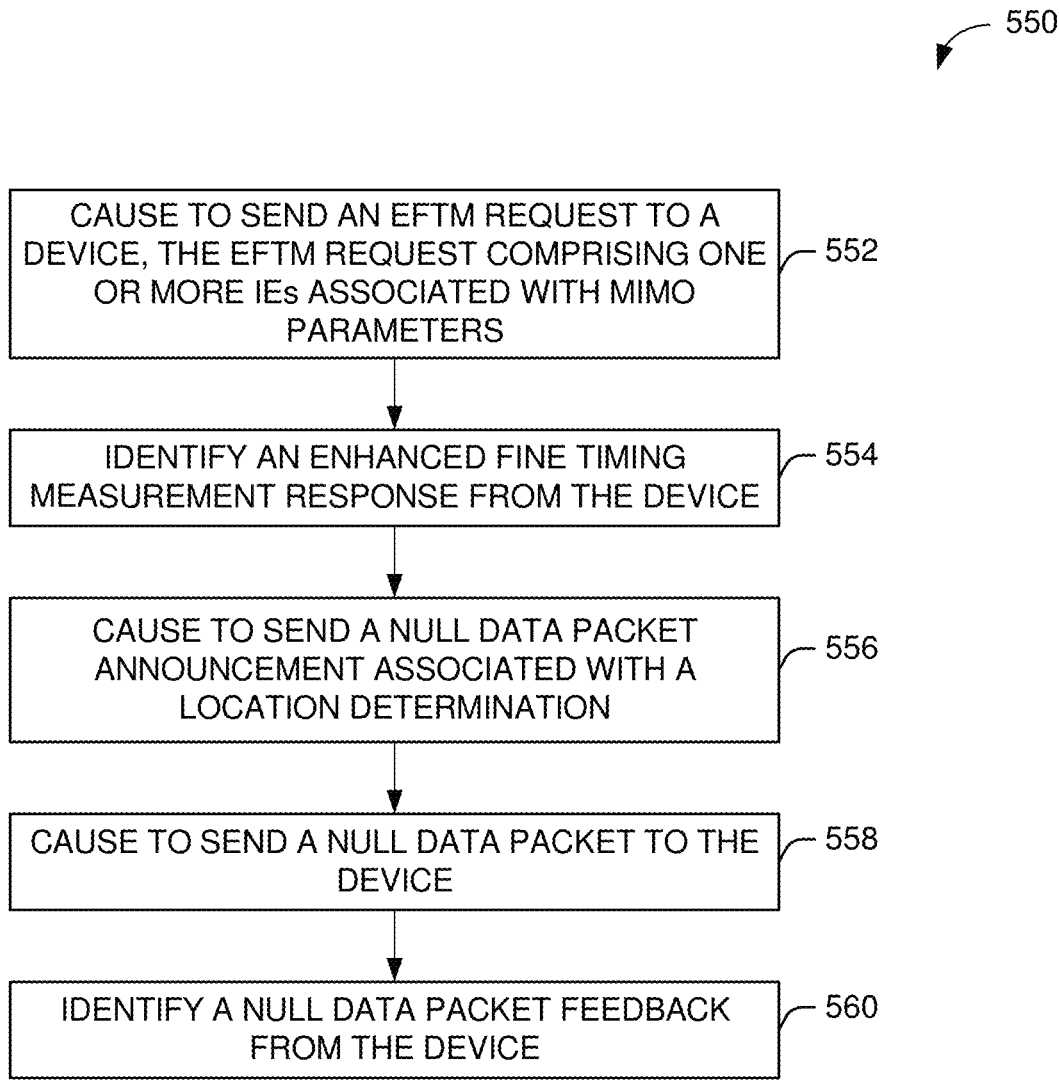
FIG. 5B depicts a flow diagram of an illustrative process for EFTM protocol negotiation, in accordance with one or more example embodiments of the present disclosure.

FIG. 5B illustrates a flow diagram of an illustrative process 550 for EFTM protocol negotiation, in accordance with one or more example embodiments of the present disclosure.

At block 552, an initiating device (e.g., the user device(s) 120 and/or the AP 102 of FIG. 1) may cause to send an EFTM request to a responding device (e.g., the user device(s) 120 and/or the AP 102 of FIG. 1), the EFTM request comprising one or more information elements associated with multiple-input multiple-output (MIMO) parameters. For example, the initiating device may wish to determine its range to another device such as a responding device, in order to determine the initiator device's location. The EFTM request may be used by the initiating device in order to establish an FTM procedure with the responding device. The EFTM request may include one or more IEs for supporting enhanced VHT MIMO parameters. These MIMO parameters may include at least in part, a number of supported TX chains, a number of supported RX chains, supported BWs, or other parameters, together with its legacy capabilities (e.g., existing REVmc FTM parameters, location context identifier (LCI) request indication, etc.). When the responding device receives the EFTM request, the responding device may respond with an acknowledgment frame in order to acknowledge receipt of the EFTM request. Further, the responding device may respond to the EFTM request by sending either a legacy FTM response or an EFTM response message that may include one or more IEs associated with the MIMO parameters.

At block 554, the initiating device may identify an EFTM response from the responding device. The responding device may have responded in either a legacy FTM response or an EFTM response based on the capability of the responding device. That is, if the responding device is a legacy responding device, the legacy responding device may ignore the newly defined IE that was used in the EFTM request sent by the initiating device. The responding device may have signed a UID to be associated with the initiating device during the FTM procedure. The initiating device may receive the response from the responding device and decode the response. After decoding the response, the initiating device may extract information from the response. For example, the initiating device determines the UID based on the extracted information. The initiating device may send an acknowledgment message to the responding device indicating that it has received the response message from the responding device.

At block 556, the initiating device may cause to send an NDPA associated with a location determination. The initiating device may employ the use of control frames, such as NDPA and NDP frames, for the repeated measurements to perform an FTM procedure. The NDPA message may include one or more fields that may assist the responding device in determining information associated with the initiating device. For example, the NDPA message may include a receiver address (RA), a transmitter address (TA), a sounding dialogue token, followed by a series of fields that may include information associated with the initiating device. The initiating device may signal that this NDPA is an NDPA for location determination by setting one or more of the fields of the NDPA. For example, the sounding dialogue token may be used to set one or more bits to indicate that this NDPA is for FTM location determination.

Measurement may be performed periodically. The measurements may also serve as keep alive from the responding device and the initiating sides keeping the UID valid. If the responding device does not receive the NDPA for a predetermined number of periods of time from the initiating device, or the initiating device did not receive an NDP feedback from the responding device for a predetermined number of periods of time as was defined in the capabilities exchange phase of FIG. 3, the UID may expire and a new UID may be allocated using the repeated capabilities exchange.

At block 558, the initiating device may cause to send a null data packet to the responding device. The initiating device may send the NDP that may help determine the range measurements associated with the FTM procedure. The responding device may respond by sending another NDP to the initiating device.

At block 560, the initiating device may identify an NDP feedback from the responding device. In the NDP feedback message, the responding device may send the following information: a feedback matrix, the NDP time of arrival (TOA or t1), and the last NDP time of departure (TOD or t4). The UID may be maintained on the initiating device side by using a keep alive process that may reset a timer associated with releasing the UID for the initiating device when the NDP feedback is received by the initiating device. If the NDP feedback is not received within a certain defined period, the UID may expire and the responding device may assign it to another device. However, if the NDP feedback is received by the initiating device before the expiry of the timer, the timer may be reset through the UID keep alive process. It is understood that the above descriptions are for purposes of illustration and are not meant to be limiting.

FIG. 6 shows a functional diagram of an exemplary communication station 600 in accordance with some embodiments. In one embodiment, FIG. 6 illustrates a functional block diagram of a communication station that may be suitable for use as an AP 102 (FIG. 1) or a user device 120 (FIG. 1) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 602 may include communications circuitry 602 and a transceiver 610 for transmitting and receiving signals to and from other communication stations using one or more antennas 601. The transceiver 610 may be a device comprising both a transmitter and a receiver that are combined and share common circuitry (e.g., communication circuitry 602). The communication circuitry 602 may include amplifiers, filters, mixers, analog to digital and/or digital to analog converters. The transceiver 610 may transmit and receive analog or digital signals. The transceiver 610 may allow reception of signals during transmission periods. This mode is known as full-duplex, and may require the transmitter and receiver to operate on different frequencies to minimize interference between the transmitted signal and the received signal. The transceiver 610 may operate in a half-duplex mode, where the transceiver 610 may transmit or receive signals in one direction at a time.

The communications circuitry 602 may include circuitry that can operate the physical layer (PHY) communications and/or media access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 2A, 2B, 3, 4, 5A and 5B.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), an EFTM protocol negotiation device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The EFTM protocol negotiation device 719 may carry out or perform any of the operations and processes (e.g., processes 500 and 550) described and shown above. For example, the EFTM protocol negotiation device 719 may be utilized to perform timing measurements between the initiating device and the responding device using control frames as opposed to management frames. Management frames have advantages in terms of negotiation because management frames do not require a response when received. However, management frames require additional processing time. Typically, FTM requires downlink and uplink paths between the initiating device and the responding device so that the initiating device may respond with an acknowledgment to a received FTM frame. A downside of using management frames is that the responding device is responsible for setting the timing of the transmission of the FTM frames. From the perspective of the initiating device, there may be some waiting involved on channel time, resulting in the entire measurement process to have increased power consumption. Further, management frames require increased processing time (e.g., in milliseconds). Typically, control frames have limited and simpler structures than management frames. That means that baseband processing may process control frames using a simpler procedure, resulting in faster processing (e.g., in microseconds). However, control frames are less flexible than management frames. Control frames are fixed in size while management frames are capable of being extended to add new capabilities. Management frames are not limited or fixed in size. Further, control frames do not include information elements, which may be used to extend the management frames.

The EFTM protocol negotiation device 719 may include a backward-compatible negotiation that may enable the measurement protocol to operate in both the associated and the unassociated modes, and may provide a single capability exchange and allocation negotiation used for multiple measurement exchanges, which minimizes the medium overhead caused by the negotiation.

The EFTM protocol negotiation device 719 may introduce a capabilities exchange phase that includes the functionality of the negotiation phase of the FTM procedure. The capabilities exchange phase may utilize one or more management frames that may be enhanced to include additional information. The capabilities exchange phase may include one or more information elements (IEs) that may be added to an FTM request frame. A benefit of the management frames as opposed to control frames is that management frames may be modified to include additional IEs. Additionally, a legacy device that receives the FTM request that includes unrecognized additional IEs may ignore those IEs, which in turn makes the EFTM protocol negotiation device 719 to be backward-compatible with legacy devices. For example, the EFTM protocol negotiation device 719 may be backward-compatible with the existing legacy REVmc protocol, such that an IEEE 802.11az device may be able to communicate with a VHT access point (AP) or legacy device supporting legacy FTM in a legacy compatible way, while using the new operational mode when both the AP and the device are IEEE 802.11az capable.

The EFTM protocol negotiation device 719 may utilize one or more control frames during the measurements phase of the FTM procedure. The EFTM protocol negotiation system may keep the flexibility of management frames during the capabilities exchange phase while enhancing the entire FTM procedure by decreasing the time it takes to perform the measurements by using control frames, which do not require as much waiting time between frames as the management frames. The measurements phase may include an exchange of null data packets between the AP and an STA. The NDP is a physical layer (PHY) protocol data unit (PPDU) that carries no data field.

The EFTM protocol negotiation device 719 may facilitate an IEEE 802.11az STA to transmit an enhanced FTM request, in post discovery (e.g., using a passive scan beacon), that may include a new IE for supporting the enhanced VHT MIMO parameters indicating the capabilities of the STA (e.g., number of supported TX chains, number of supported RX chains, supported BWs, etc.) together with its legacy capabilities (e.g., existing REVmc FTM parameters, location configuration information (LCI) request indication, etc.).

The 802.11ac protocol uses a referencing mechanism for the MAC address that uses what is known as an associated ID (AID) instead of the MAC address. The MAC addresses are typically hardcoded in the devices during manufacturing. However, the AID is assigned to the device during association. Therefore, one additional consideration for the EFTM protocol negotiation device 719 is to introduce a new addressing mechanism because the MAC addressing is not compatible with it and because the FTM procedure has to operate in the associated and the unassociated modes. In the unassociated cases, addressing is not yet established since the AID would not have been assigned yet. Therefore, the EFTM protocol negotiation device 719 may facilitate a new addressing mechanism in order to account for the unassociated cases; however, this new addressing mechanism may also apply to the associated mechanism. The new addressing mechanism is referred to hereinafter as an unassociated ID (UID). In the associated mode, a device may use an AID or a UID.

During the capabilities exchange phase, if the device is already associated with the AP, then both the device and the AP know each other's capabilities. During association, the security context is established. In the case of the EFTM procedure, the security context may be desirable. Consequently, the one or more additional IEs may include an IE associated with the security context that may be exchanged between the AP and the STA.

The EFTM protocol negotiation device 719 may be configured to allow a legacy AP to ignore the newly defined IE and may respond with a legacy FTM response frame, while an IEEE 802.11az capable AP may respond with an FTM response frame including a new IEEE 802.11az IE providing its capabilities (e.g., supported bandwidth, number of supported TX chains, number of supported RX chains, LCI for all antennas) and may assign a unique identifier for the unassociated operation unique identifier (UID). The UID may be maintained using a keep alive process of transmitting a null data packet announcement (NDPA) for location, and resetting the timer. If no NDPA is received within a certain defined period of time, the UID may expire and the AP may assign the UID to another STA.

It is understood that the above are only a subset of what the EFTM protocol negotiation device 719 may be configured to perform and that other functions included throughout this disclosure may also be performed by the EFTM protocol negotiation device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a single input single output (SISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FUM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

According to example embodiments of the disclosure, there may be a device. The device may include memory and processing circuitry configured to identify an enhanced fine timing measurement request received from a first device, the enhanced fine timing measurement request may include one or more information elements associated with one or more multiple-input multiple-output (MIMO) parameters. The processing circuitry may be further configured to cause to send an enhanced fine timing measurement response to the first device. The processing circuitry may be further configured to identify a null data packet announcement associated with a location determination of the first device. The processing circuitry may be further configured to identify a null data packet received from the first device based on receiving the null data packet announcement. The processing circuitry may be further configured to cause to send a null data packet feedback to the first device.

The implementations may include one or more of the following features. The null data packet announcement and the null data packet feedback are control frames and the null data packet is a physical layer (PHY) convergence protocol data unit (PPDU) received based on the fine time measurement response. The one or more MIMO parameters include at least one of a number of supported transmit chains, a number of supported receive chains, a supported bandwidth, or a legacy compatibility. The processing circuitry is further configured to allocate a pre-association identification (pre-AID) to the first device. The processing circuitry may be further configured to cause to start a pre-AID allocation timer. The processing circuitry is further configured to cause to maintain the pre-AID allocation to the first device before expiration of the pre-AID allocation timer. The pre-AID allocation timer is associated with a time the enhanced fine timing measurement response is sent to the first device. The processing circuitry is further configured to determine a location of the device based at least in part on measurements of null data packet announcement, the null data packet feedback and null data packet and location configuration information (LCI) extracted from the fine timing measurement response. The null data packet announcement may include an indication of location. The device may further include a transceiver configured to transmit and receive wireless signals. The device may further include one or more antennas coupled to the transceiver.

According to example embodiments of the disclosure, there may be a device. The device may include memory and processing circuitry configured to causing to send an enhanced fine timing measurement request to a device, the enhanced fine timing measurement request may include one or more information elements associated with multiple-input multiple-output (MIMO) parameters. The processing circuitry may be further configured to identify an enhanced fine timing measurement response from the device. The processing circuitry may be further configured to cause to send a null data packet announcement associated with a location determination. The processing circuitry may be further configured to cause to send a null data packet to the device. The processing circuitry may be further configured to identify null data packet feedback from the device.

The implementations may include one or more of the following features. The one or more MIMO parameters include at least one of a number of supported transmit chains, a number of supported receive chains, supported bandwidths, or legacy capabilities. The processing circuitry is configured to identify an unassociated identification (pre-AID) allocated by the device and included in the enhanced fine timing measurement response. The null data packet announcement and the null data packet feedback are control frames and the null data packet is a physical layer (PHY) convergence protocol data unit (PPDU) received based on the fine time measurement response. The processing circuitry is configured to determine a location of the device based at least in part on measurements of null data packet announcement, the null data packet feedback and null data packet and location configuration information (LCI) extracted from the fine timing measurement response. The null data packet announcement may include an indication of location.

According to example embodiments of the disclosure, there may be a non-transitory computer-readable medium storing computer-executable instructions which, when executed by a processor, cause the processor to perform operations. The operations may include causing to send an enhanced fine timing measurement request to a device, the enhanced fine timing measurement request may include one or more information elements associated with multiple-input multiple-output (MIMO) parameters. The operations may include identifying an enhanced fine timing measurement response from the device. The operations may include causing to send a null data packet announcement associated with a location determination. The operations may include causing to send a null data packet to the device. The operations may include identifying a null data packet feedback from the device.

The implementations may include one or more of the following features. The one or more MIMO parameters include at least one of a number of supported transmit chains, a number of supported receive chains, supported bandwidths, or legacy capabilities. The operations further comprise identifying an unassociated identification (pre-AID) allocated by the device and included in the enhanced fine timing measurement response. The null data packet announcement and the null data packet feedback are control frames and the null data packet is a physical layer (PHY) convergence protocol data unit (PPDU) received based on the fine time measurement response. The operations further comprise determining a location of the device based at least in part on measurements of null data packet announcement, the null data packet feedback and null data packet and location configuration information (LCI) extracted from the fine timing measurement response. The null data packet announcement may include an indication of location.

According to example embodiments of the disclosure, there may be a non-transitory computer-readable medium storing computer-executable instructions which, when executed by a processor, cause the processor to perform operations. The operations may include identifying, by one or more processors, an enhanced fine timing measurement request received from a first device, the enhanced fine timing measurement request may include one or more information elements associated with one or more multiple-input multiple-output (MIMO) parameters. The operations may include cause to send an enhanced fine timing measurement response to the first device. The operations may include identify a null data packet announcement associated with a location determination of the first device. The operations may include identify a null data packet received from the first device based on receiving the null data packet announcement. The operations may include cause to send a null data packet feedback to the first device.

The implementations may include one or more of the following features. The null data packet announcement and the null data packet feedback are control frames and the null data packet is a physical layer (PHY) convergence protocol data unit (PPDU) received based on the fine time measurement response. The one or more MIMO parameters include at least one of a number of supported transmit chains, a number of supported receive chains, supported bandwidths, or legacy capabilities. The operations may include allocating an unassociated identification (PRE-AID) to the first device. The operations may include causing to start a PRE-AID allocation timer. The operations may include maintaining the pre-AID allocation to the first device before expiration of the pre-AID allocation timer. The pre-AID allocation timer is associated with a time the enhanced fine timing measurement response is sent to the first device. The operations may include determining a location of the device based at least in part on measurements of null data packet announcement, the null data packet feedback and null data packet and location configuration information (LCI) extracted from the fine timing measurement response. The null data packet announcement may include an indication of location.

According to example embodiments of the disclosure, there may include a method. The method may include identifying, by one or more processors, an enhanced fine timing measurement request received from a first device, the enhanced fine timing measurement request may include one or more information elements associated with one or more multiple-input multiple-output (MIMO) parameters. The method may include causing to send an enhanced fine timing measurement response to the first device. The method may include identifying a null data packet announcement associated with a location determination of the first device. The method may include identifying a null data packet received from the first device based on receiving the null data packet announcement. The method may include causing to send a null data packet feedback to the first device.

The implementations may include one or more of the following features. The null data packet announcement and the null data packet feedback are control frames and the null data packet is a physical layer (PHY) convergence protocol data unit (PPDU) received based on the fine time measurement response. The one or more MIMO parameters include at least one of a number of supported transmit chains, a number of supported receive chains, supported bandwidths, or legacy capabilities. The method may further include allocating an unassociated identification (PRE-AID) to the first device. The method may include causing to start a PRE-AID allocation timer. The method may further include maintaining the pre-AID allocation to the first device before expiration of the pre-AID allocation timer. The pre-AID allocation timer is associated with a time the enhanced fine timing measurement response is sent to the first device. The method may further include determining a location of the device based at least in part on measurements of null data packet announcement, the null data packet feedback and null data packet and location configuration information (LCI) extracted from the fine timing measurement response. The null data packet announcement includes an indication of location.

According to example embodiments of the disclosure, there may include a method. The method may include causing to send an enhanced fine timing measurement request to a device, the enhanced fine timing measurement request may include one or more information elements associated with multiple-input multiple-output (MIMO) parameters. The method may include identifying an enhanced fine timing measurement response from the device. The method may include causing to send a null data packet announcement associated with a location determination. The method may include causing to send a null data packet to the device. The method may include identifying a null data packet feedback from the device. The one or more MIMO parameters include at least one of a number of supported transmit chains, a number of supported receive chains, supported bandwidths, or legacy capabilities. The method may further include identifying an unassociated identification (pre-AID) allocated by the device and included in the enhanced fine timing measurement response. The null data packet announcement and the null data packet feedback are control frames and the null data packet is a physical layer (PHY) convergence protocol data unit (PPDU) received based on the fine time measurement response. The method may further include determining a location of the device based at least in part on measurements of null data packet announcement, the null data packet feedback and null data packet and location configuration information (LCI) extracted from the fine timing measurement response. The null data packet announcement includes an indication of location. In example embodiments of the disclosure, there may be an apparatus. The apparatus may include means for identifying, by one or more processors, an enhanced fine timing measurement request received from a first device, the enhanced fine timing measurement request may include one or more information elements associated with one or more multiple-input multiple-output (MIMO) parameters. The apparatus may include means for causing to send an enhanced fine timing measurement response to the first device. The apparatus may include means for identifying a null data packet announcement associated with a location determination of the first device. The apparatus may include means for identifying a null data packet received from the first device based on receiving the null data packet announcement. The apparatus may include means for causing to send a null data packet feedback to the first device.

The implementations may include one or more of the following features. The null data packet announcement and the null data packet feedback are control frames and the null data packet is a physical layer (PHY) convergence protocol data unit (PPDU) received based on the fine time measurement response. The one or more MIMO parameters include at least one of a number of supported transmit chains, a number of supported receive chains, supported bandwidths, or legacy capabilities. The apparatus may further include means for allocating an unassociated identification (PRE-AID) to the first device; and means for causing to start a PRE-AID allocation timer. The apparatus may further include means for maintaining the pre-AID allocation to the first device before expiration of the pre-AID allocation timer. The pre-AID allocation timer is associated with a time the enhanced fine timing measurement response is sent to the first device. The apparatus may further include means for determining a location of the device based at least in part on measurements of null data packet announcement, the null data packet feedback and null data packet and location configuration information (LCI) extracted from the fine timing measurement response. The null data packet announcement includes an indication of location.

In example embodiments of the disclosure, there may be an apparatus. The apparatus may include means for causing to send an enhanced fine timing measurement request to a device, the enhanced fine timing measurement request may include one or more information elements associated with multiple-input multiple-output (MIMO) parameters. The apparatus may include means for identifying an enhanced fine timing measurement response from the device. The apparatus may include means for causing to send a null data packet announcement associated with a location determination. The apparatus may include means for causing to send a null data packet to the device. The apparatus may include means for identifying a null data packet feedback from the device.

The implementations may include one or more of the following features. The one or more MIMO parameters include at least one of a number of supported transmit chains, a number of supported receive chains, supported bandwidths, or legacy capabilities. The apparatus may further include means for identifying an unassociated identification (pre-AID) allocated by the device and included in the enhanced fine timing measurement response. The null data packet announcement and the null data packet feedback are control frames and the null data packet is a physical layer (PHY) convergence protocol data unit (PPDU) received based on the fine time measurement response. The apparatus may further include means for determining a location of the device based at least in part on measurements of null data packet announcement, the null data packet feedback and null data packet and location configuration information (LCI) extracted from the fine timing measurement response. The null data packet announcement includes an indication of location.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
   identify an initial fine timing measurement request (IFTMR) received from an initiating device, the IFTMR comprising one or more first information elements associated with a ranging specific standard, wherein the one or more first information elements indicate an availability for a range measurement session;
   transmit an acknowledgment (ACK) frame to the initiating device acknowledging the reception of the IFTMR;
   transmit a fine timing measurement (FTM) frame to the initiating device, wherein the FTM frame comprises one or more second information elements, and wherein the one or more second information elements include a ranging information element that comprises a bandwidth, a number of supported Tx chains, and a number of supported Rx chains, distinguishing the FTM frame from legacy frames;

identify a null data packet announcement (NDPA) used for a location determination of the initiating device, wherein the NDPA comprises an address of the initiating device that sent the IFTMR, and wherein the NDPA is sent in response to the IFTMR as part of a negotiation phase, including capability exchange, repeated measurements, and termination phases;

identify a null data packet received from the initiating device based on receiving the null data packet announcement; and cause to send a null data packet feedback to the initiating device.

2. The device of claim 1, wherein the ranging specific standard is 802.11az.

3. The device of claim 1, wherein the one or more first information elements comprise a number of supported transmit chains.

4. The device of claim 1, wherein the one or more second information elements define a negotiation associated with the range measurement session.

5. The device of claim 1, wherein the IFTMR is received during a negotiation of the range measurement session.

6. The device of claim 1, wherein the NDPA is received during a ranging measurement session.

7. The device of claim 1, wherein the initiating device is unassociated or associated device.

8. The device of claim 1, further comprising a transceiver configured to transmit and receive wireless signals.

9. The device of claim 8, further comprising an antenna coupled to the transceiver to transmit the null data packet feedback.

10. A non-transitory computer-readable medium storing computer-executable instructions which when executed by one or more processors of an initiating device result in performing operations comprising:

transmitting an initial fine timing measurement request (IFTMR) to a responding device, the IFTMR comprising one or more first information elements associated with a ranging specific standard, wherein the one or more first information elements indicate an availability for a range measurement session;

identifying an acknowledgment (ACK) frame from the responding device acknowledging the reception of the IFTMR;

identifying a fine timing measurement (FTM) frame from the responding device, wherein the FTM frame comprises one or more second information elements, and wherein the one or more second information elements include a ranging information element that comprises a bandwidth, a number of supported Tx chains, and a number of supported Rx chains, distinguishing the FTM frame from legacy frames;

transmitting a null data packet announcement (NDPA) used for a location determination, wherein the NDPA comprises an address of the initiating device after sending the IFTMR, and wherein the NDPA is sent in response to the IFTMR as part of a negotiation phase, including capability exchange, repeated measurements, and termination phases;

transmitting a null data packet based on receiving the null data packet announcement; and identifying a null data packet feedback from the responding device.

11. The non-transitory computer-readable medium of claim 10, wherein the ranging specific standard is 802.11az.

12. The non-transitory computer-readable medium of claim 10, wherein the one or more first information elements comprise a number of supported transmit chains.

13. The non-transitory computer-readable medium of claim 10, wherein the one or more second information elements define a negotiation associated with the range measurement session.

14. The non-transitory computer-readable medium of claim 10, wherein the IFTMR is received during a negotiation of the range measurement session.

15. The non-transitory computer-readable medium of claim 10, wherein the NDPA is received during a ranging measurement session.

16. A method comprising:

identifying, by one or more processors, an initial fine timing measurement request (IFTMR) received from an initiating device, the IFTMR comprising one or more first information elements associated with a ranging specific standard, wherein the one or more first information elements indicate an availability for a range measurement session;

transmitting an acknowledgment (ACK) frame to the initiating device acknowledging the reception of the IFTMR;

transmitting a fine timing measurement (FTM) frame to the initiating device, wherein the FTM frame comprises one or more second information elements, and wherein the one or more second information elements include a ranging information element that comprises a bandwidth, a number of supported Tx chains, and a number of supported Rx chains, distinguishing the FTM frame from legacy frames;

identifying a null data packet announcement (NDPA) used for a location determination of the initiating device, wherein the NDPA comprises an address of the initiating device that sent the IFTMR, and wherein the NDPA is sent in response to the IFTMR as part of a negotiation phase, including capability exchange, repeated measurements, and termination phases;

identifying a null data packet received from the initiating device based on receiving the null data packet announcement; and causing to send a null data packet feedback to the initiating device.

17. The method of claim 16, wherein the ranging specific standard is 802.11az.

18. The method of claim 16, wherein the one or more first information elements comprise a number of supported transmit chains.

19. The method of claim 16, wherein the one or more second information elements define a negotiation associated with the range measurement session.

20. The method of claim 16, wherein the IFTMR is received during a negotiation of the range measurement session.

* * * * *